(No Model.) 3 Sheets—Sheet 1.

H. H. LITTLE.
FIRE ESCAPE.

No. 278,249. Patented May 22, 1883.

Attest:
F. H. Schott
A. R. Brown

Inventor
Henry H. Little
by J. C. Tasker atty

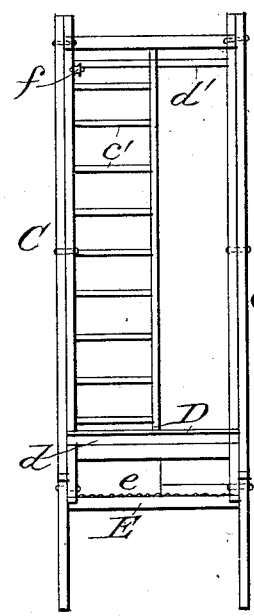
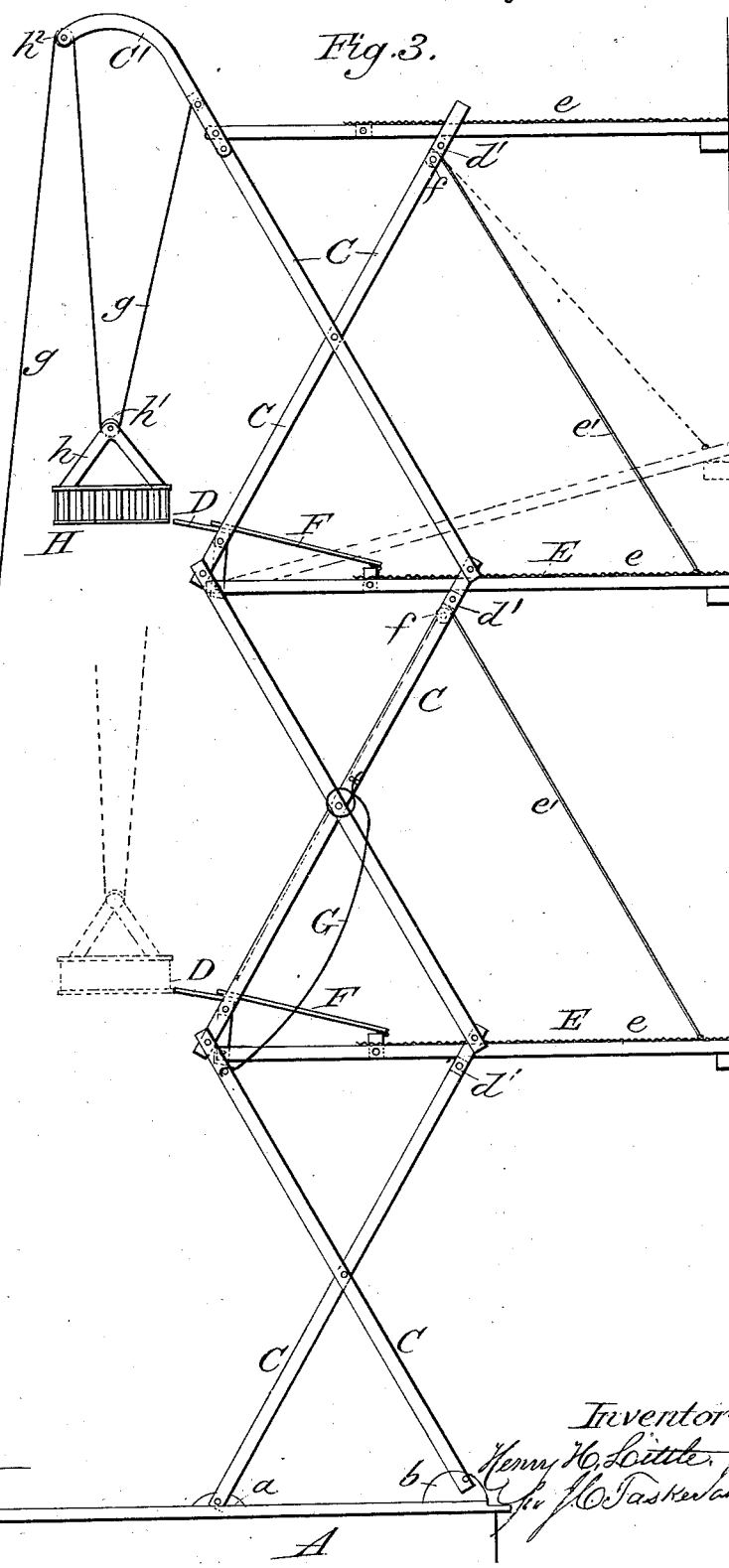

(No Model.)  H. H. LITTLE.  3 Sheets—Sheet 3.
FIRE ESCAPE.

No. 278,249. Patented May 22, 1883.

Attest:
F. H. Schott
A. R. Brown.

Inventor:
Henry H. Little
per J. C. Taskeratty

N. PETERS, Photo-Lithographer, Washington, D. C.

UNITED STATES PATENT OFFICE.

HENRY H. LITTLE, OF CHAMBERSBURG, PENNSYLVANIA.

FIRE-ESCAPE.

SPECIFICATION forming part of Letters Patent No. 278,249, dated May 22, 1883.

Application filed September 4, 1882. (No model.)

*To all whom it may concern:*

Be it known that I, HENRY H. LITTLE, a citizen of the United States, residing at Chambersburg, in the county of Franklin and State of Pennsylvania, have invented certain new and useful Improvements in Fire-Escapes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of portable fire-escapes that are mounted upon trucks or wagon-bodies provided with means for raising and lowering the ladders and platforms composing the effective portion of the apparatus; and the invention consists in certain peculiarities in the construction, arrangement, and combination of parts, as will be hereinafter more particularly specified.

Figure 1:
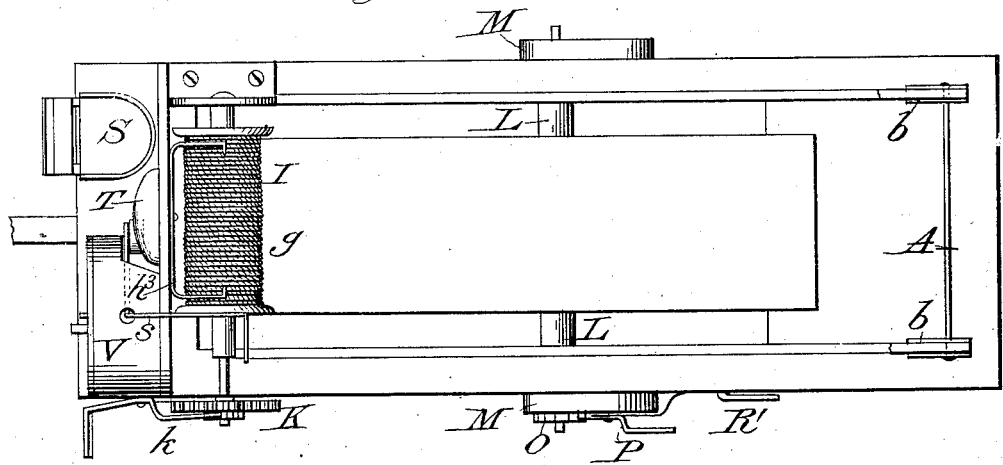
Figure 2:
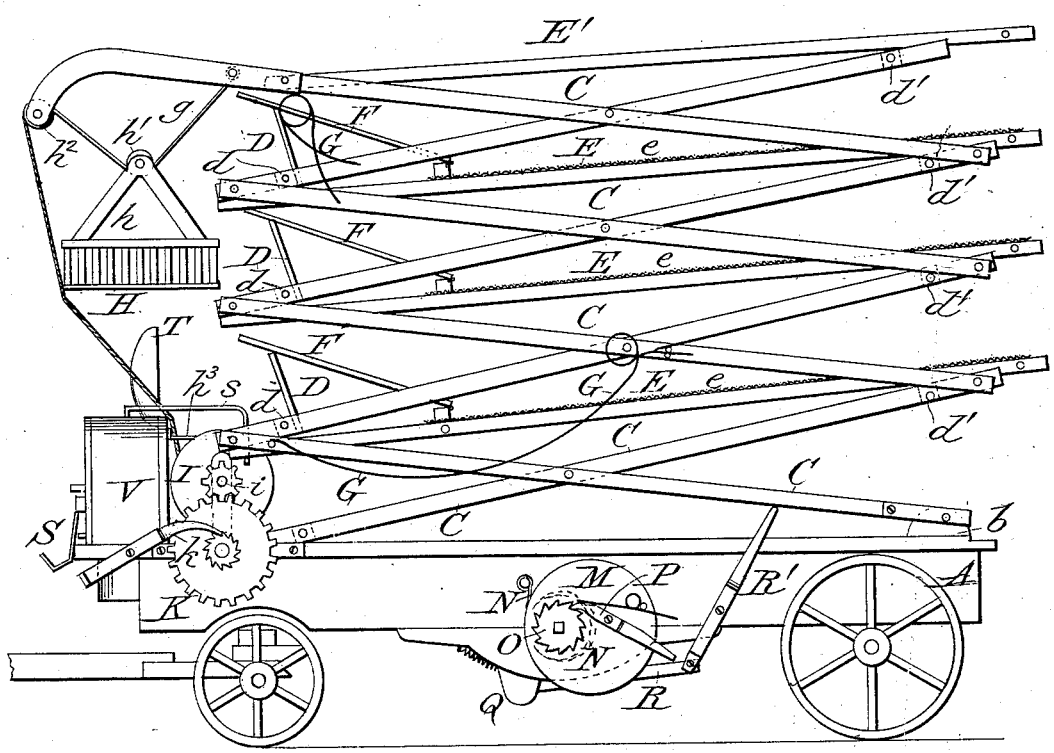
Figure 6:
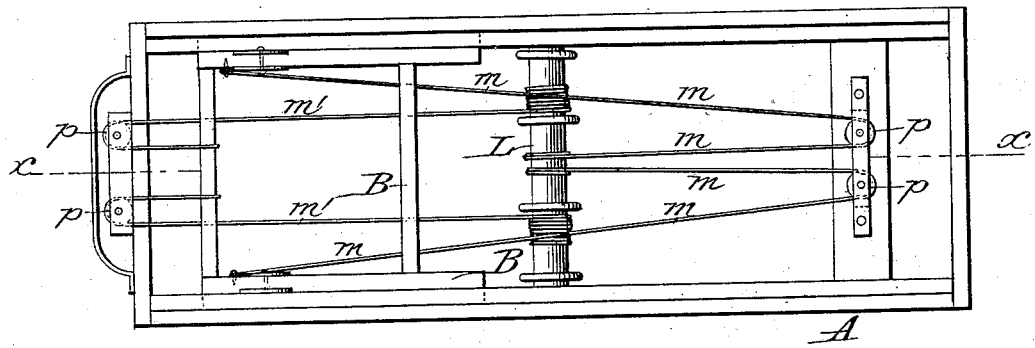
Figure 7:
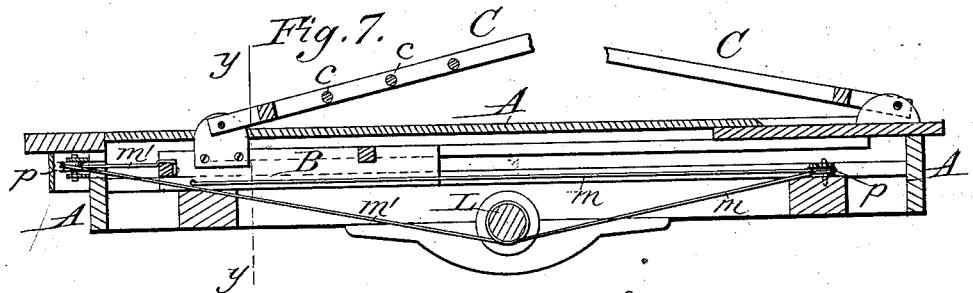
Figure 8:
Figure 9:
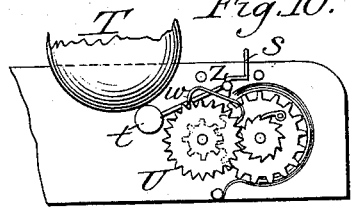
Figure 10:
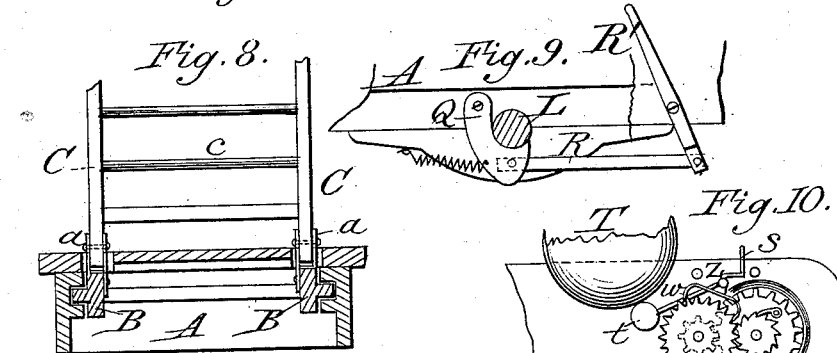
Figure 11:
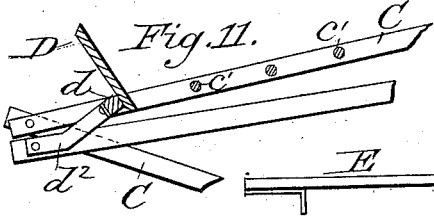
Figure 12:
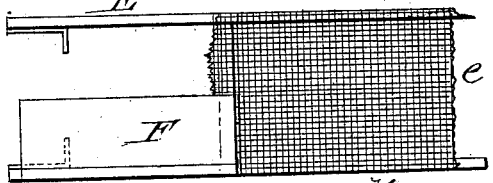

In the annexed drawings, illustrating the invention, Figure 1 is a top view of a truck or wagon-body with the upper part of the apparatus removed. Fig. 2 is a side elevation of the apparatus, showing the ladders and other parts of the fire-escape lowered and in readiness for operation. Fig. 3 is a partial side view, showing the fire-escape extended or elevated for use. Fig. 4 is a front view of a portion of the fire-escape between two of the extended platforms. Fig. 5 is a front view of a vertically-movable basket or car that is suspended from the upper part of the ladder-frame. Fig. 6 is a plan of truck with the upper part removed, showing the sliding frame or carriage to which the extensible ladder-frame is attached. Fig. 7 is a vertical longitudinal section on the line $x\ x$ of Fig. 6. Fig. 8 is a cross-section on the line $y\ y$ of Fig. 7. Fig. 9 represents a brake mechanism for regulating the ascent of the fire-escape. Fig. 10 represents a gong mechanism, and Figs. 11 and 12 are detail views of the ladders and platforms composing the upper part of the fire-escape.

Like letters of reference are used to designate the same parts throughout the several views.

The truck A is arranged to support a sliding carriage or frame, B, to bearings $a\ a$ on each side of which are pivoted the forward ends of the lower section of an extensible ladder-frame composed of the lazy-tongs C C, the rear ends of said lower section being pivoted in bearings $b\ b$, secured to the truck-body. The lazy-tongs or frame C is composed of any convenient number of sections, which are pivoted to each other in the usual manner, so as to be readily extensible when desired. The forward inclined portion of the lower section is provided with rounds $c$, extending transversely between its two sides, thus forming a broad ladder. A narrow ladder, $c'$, is arranged at one side of each upper section. At the lower end of each section above the first or bottom one is a cross-piece, $d$, to which is secured an inclined foot-board or guard, D, that forms the lower part of each upper ladder. The various sections of the lazy-tongs or frame C are connected at the rear by means of cross-pieces $d'\ d'$.

Between the various sections of the ladder-frame C are arranged platforms E, which are pivoted at their forward ends to bearings $d^2$, beneath the foot-boards D, while their rear ends rest normally upon the rear cross-pieces, $d'$. These platforms consist of oblong frames, each of which supports a light but durable wire-netting, $e$, the platforms being thus made of sufficient strength to fulfill the purposes for which they are designed, and yet possess but little weight, being easily supported by the extensible frame, to which they are attached. When the frame C is folded the rear ends of the platforms E project but little beyond the rear ends of the adjustable sections composing the frame C; but when the latter is extended, as shown in Fig. 3, the platforms will extend a sufficient distance at the rear to enable them to rest upon the window-sills of the building without bringing the truck A and frame C in contact with said building, it being thus unnecessary to expose the truck and frame to contact with the flames of a burning building. An opening in the forward end of each platform is partially covered by a pivoted bridge, F, the free end of which rests on the foot-board D, as shown in Figs. 2 and 3, and a suitable opening is also made near the rear end of each platform, said openings being for the purpose of affording a passage to and from the adjacent ladders.

Attached to each pivoted platform E is a rope or chain, $e'$, that passes over a pulley, $f$, on the next section above, and is secured at any suitable point so as to be within reach of a person on the platform, who by simply drawing on the rope or chain can thus readily raise or lower the platform for the purpose of facilitating its engagement with the window-sills or other similar portion of an adjacent building.

At the top of the folding ladder-frame C is a pivoted platform, E′, which is similar to the platforms E. On each side of the ladder-frame C, and arranged at suitable points so as to connect adjacent sections of the frame, are attached spring-braces G G, which aid in starting the sections upward when the frame is extended or unfolded. The upper section of the folding or extensible ladder-frame C is provided with forward and downward curved arms C′ C′, from which is suspended a car or basket, H, by means of cords, ropes, or chains $g\ g$, that are attached at one end to the arms C′, and at their opposite ends are wound upon a drum or windlass, I, at the forward end of the truck. The car H is provided with arms or handles $h\ h$, carrying pulleys $h'\ h'$, and the ropes or chains $g\ g$ are passed under these pulleys $h'$ and over pulleys $h^2$, attached to the ends of the arms C′, the ropes or chains being retained in proper position by means of a guide or guides, $h^3$, attached to the truck in front of and above the windlass. The shaft of the windlass or drum I is provided at either or both ends with a pinion, $i$, that meshes with a large gear-wheel, K, having a suitable crank and a pawl-and-ratchet mechanism, $k$; or the windlass may be operated and controlled by any other suitable means. It will be observed that the car or basket H is thus suspended from the forward or least exposed end of the ladder-frame in such a manner that when the latter is extended for use near a burning building the car H may be readily operated for the purpose of saving life or property without exposing its contents to injury from flame.

It is obvious that when the ladder-frame C is extended in a vertical position and connected by means of the pivoted platforms E with the windows, roof, or other parts of a burning building the car H may be elevated at will to any desired point, so as to bring it in proximity to the front or outer ends of the platforms, over which persons or property may be passed and deposited in said car, the pivoted or folding bridges or gangways F, in connection with the foot-boards D, affording a convenient access to the car, as shown in Fig. 3.

The sliding carriage B, to which the extensible ladder-frame C is pivoted, is caused to move in suitable guideways formed in the truck, so as to unfold and elevate said ladder-frame when desired. This is effected by means of ropes or chains $m\ m'$, connecting the carriage B with a drum or windlass, L, arranged near the center of the truck, said ropes or chains being passed over pulleys $p\ p$, as shown in Figs. 6 and 7. On one or both sides of the truck or wagon-body A is a box, M, that incloses a coiled spring, N, one end of which is secured to the truck, while the other end is attached to the end of the windlass which projects through the side of the truck and inclosing-box. The windlass L is provided with cranks or other means of rotation, so as to wind the spring for use. The shaft of the windlass is also provided at one or both ends, exterior to the box M, with a ratchet-wheel, O, which is held by a spring-pawl, P, so as to prevent the windlass from being acted upon by the spring N until it is desired to elevate the fire-escape. It will be seen that after the spring N has been wound, if the spring-pawl P is raised so as to release the ratchet O, the tension of the spring or springs N, acting upon the windlass L, will cause the latter to revolve, so as to wind the ropes or chains $m\ m$ and unwind those designated by the letters $m'\ m'$, thereby drawing the carriage B toward the rear end of the truck. As the forward end of the extensible ladder-frame C is pivoted to the sliding carriage B, while the rear ends of said extensible frame are pivoted to the truck, it is obvious that the rearward movement of the carriage B will cause the lower ends of the extensible frame C to approach each other, thereby unfolding and elevating said frame and its attachments.

In Fig. 9 is illustrated a brake mechanism consisting of a spring-shoe, Q, and levers R R′, for controlling the rotation of the drum L, and thus regulating the movement of the carriage B and its attached ladders. In order to stop the extensible ladder-frame C at any desired point, it is only necessary to drop the spring-pawl P into engagement with the ratchet O. When it is desired to lower the fire-escape or ladder-frame C the windlass L is rotated in the opposite direction, so as to wind the ropes or chains $m'$ and unwind the chains $m$, thus drawing the carriage B toward the forward end of the truck, which consequently lowers the attached ladders. The springs N N at the same time are wound for future use in extending the ladder-frame.

At the forward end of the truck, near the driver's seat S, or at other convenient point, is a gong, T, arranged to be automatically sounded by the ascent of the ladders. This is effected by the release of a cranked arm, $s$, Figs. 1 and 2, which is normally held down by the weight of the forward end of the frame C, resting thereon; but when the frame is elevated, so as to release the arm $s$, a hammer, $t$, attached thereto, will be caused to strike the gong through the force exerted by an ordinary clock mechanism, U, which is inclosed in a box, V, located near said gong. The cranked arm $s$, hammer $t$, and escapement $w$ of the clock mechanism are connected and supported by a rock-shaft, $z$, as shown in Fig. 10. This clock mechanism is provided with means, as usual, for winding its actuating-spring, and by acting upon the gong serves as an alarm.

Having thus described my invention, what I claim as new, and desire to secure by Letters Patent, is—

1. The combination of the extensible ladder-frame C C, pivoted platforms E E, having wire coverings or nettings $e\ e$, foot-boards D D, and spring-braces G G, substantially as described.

2. The combination of the extensible frame C, having ladders $c\ c'$, the pivoted platforms E E, and the ropes or chains $e'\ e'$ and pulleys $f\ f$ for inclining said platforms, substantially as described.

3. The combination of the truck A, sliding carriage B, windlass L, means for connecting said windlass and carriage, spring N for actuating the windlass, pawl P and ratchet O for controlling the windlass, and brake mechanism for stopping its rotation, substantially as described.

4. The combination, with the truck A and extensible fire-escape C, of the gong T, clock mechanism U, and the rock-shaft $z$, carrying an escapement, $w$, hammer $t$, and cranked arm $s$, substantially as described.

5. The combination of the truck A, sliding carriage B, extensible ladder-frame C, having arms C', carrying pulleys $h^2$, the windlass I, having a shaft provided with pinion $i$, the gear-wheel K, pawl and ratchet $k$, car H, having arms $h\ h$, carrying pulleys $h'\ h'$, the ropes or chains $g\ g$, and the guide $h^3$, all substantially as shown and described.

In testimony whereof I affix my signature in presence of two witnesses.

HENRY H. LITTLE.

Witnesses:
  JAS. A. McKNIGHT,
  W. S. STENGER.